US008960922B2

(12) United States Patent
Hino

(10) Patent No.: US 8,960,922 B2
(45) Date of Patent: Feb. 24, 2015

(54) PROJECTOR AND CONTROL METHOD OF THE SAME

(75) Inventor: Shunsuke Hino, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 126 days.

(21) Appl. No.: 13/541,375

(22) Filed: Jul. 3, 2012

(65) Prior Publication Data

US 2013/0010212 A1  Jan. 10, 2013

(30) Foreign Application Priority Data

Jul. 5, 2011  (JP) ................. 2011-148902

(51) Int. Cl.
*G03B 21/16*  (2006.01)
*G03B 21/00*  (2006.01)
*G03B 21/20*  (2006.01)

(52) U.S. Cl.
CPC .............. *G03B 21/16* (2013.01); *G03B 21/006* (2013.01); *G03B 21/2026* (2013.01)
USPC ............................................ 353/57; 348/759

(58) Field of Classification Search
CPC .................................................. H04N 5/7441
USPC ................... 348/744, E9.027, 795; 353/57
See application file for complete search history.

(56) References Cited

U.S. PATENT DOCUMENTS

| 7,088,058 | B2 | 8/2006 | Shiota et al. |
| 7,484,852 | B2 | 2/2009 | Kuraie |
| 8,022,348 | B2 | 9/2011 | Namba et al. |
| 2001/0235797 | * | 8/2001 | ota et al. .......................... 353/57 |
| 2003/0005146 | A1* | 1/2003 | Sato et al. ....................... 353/57 |
| 2003/0020884 | A1* | 1/2003 | Okada et al. .................... 353/57 |

FOREIGN PATENT DOCUMENTS

| JP | A-63-200136 | 8/1988 |
| JP | A-11-337897 | 12/1999 |
| JP | 2001235797 | * 8/2001 |
| JP | A-2001-235797 | 8/2001 |
| JP | A-2002-033978 | 1/2002 |
| JP | 2003005146 | * 1/2003 |
| JP | A-2003-005146 | 1/2003 |
| JP | A-2005-227478 | 8/2005 |
| JP | A-2006-030645 | 2/2006 |
| JP | A-2007-256920 | 10/2007 |
| JP | B2-4003796 | 11/2007 |
| JP | A-2007-323082 | 12/2007 |
| JP | A-2009-069459 | 4/2009 |
| JP | B2-4266767 | 5/2009 |
| JP | A-2010-032944 | 2/2010 |

\* cited by examiner

*Primary Examiner* — Jefferey Harold
*Assistant Examiner* — Sihar Karwan
(74) *Attorney, Agent, or Firm* — Oliff PLC

(57) ABSTRACT

A projector that performs light control by varying power level of a light source in response to a video signal, includes a cooling fan that cools the light source, and a control device that averages samples of the power level of the light source based on the video signal or a brightness level of the video signal acquired with respect to each unit time and performs feedback control of a rotational speed of the cooling fan based on the average value, wherein the control device varies the number of samples and calculates the average value between the cases where the power level or the brightness level is rising and falling.

5 Claims, 7 Drawing Sheets

PROJECTOR AND CONTROL METHOD OF THE SAME

BACKGROUND

1. Technical Field

The present invention relates to a projector and a control method thereof.

2. Related Art

In an ultrahigh-pressure mercury lamp (light source lamp) generally used as a light source of a projector, when the lamp temperature is too low, mercury is condensed, and problems of reduction in reliability, reduction in illuminance, and deterioration in hue arise. In the case where light control is performed by varying power of the light source lamp in response to a video signal (brightness level), temperature control of the lamp is important. It is necessary to secure the reliability, stabilize the illuminance, and maintain the hue while keeping the evaporated state of the mercury by holding the lamp temperature as high as possible. The temperature of the light source lamp may be appropriately adjusted by controlling the rotational speed of the cooling fan that blows air toward the lamp.

However, the cooling fan is also a source of noise and, if the rotational speed is frequently varied, the noise may be deteriorated. Accordingly, a method of controlling the rotational speed of the fan for a suitable temperature of the light source lamp based on an integral value (average value) of a brightness level of video signal or lamp power has been known (Patent Document 1 (Japanese Patent No. 4003796)). In Patent Document 1, a fan drive signal generation unit that controls the rotational speed of the fan based on an input signal from a lamp power level calculation unit and an input signal from a lamp drive level signal integration unit is provided.

The integral value of the brightness level of the video signal or lamp power is used so that the rotational speed of the fan may not be sensitive to the brightness level of the video signal. Thereby, the rotational speed of the fan smoothly varies and the rotational speed of the fan follows the variations of the brightness level of the video signal with a delay.

In the ultrahigh-pressure mercury lamp, when the brightness level of the video signal or the lamp power shifts from the lower state to the higher state, the lamp temperature rises and the mercury within the arc tube turns from the condensed state to the evaporated state. Further, the rotational speed of the cooling fan also shifts from the slower state to the faster state in response to the average value of the brightness level of the light source lamp. In this regard, to evaporate the mercury within the arc tube as fast as possible, the lamp temperature is desirably held as high as possible. Accordingly, when the brightness level of the video signal (lamp power) rises, the speed at which the rotational speed of the cooling fan increases is preferably lower, and the delay effect according to the method in related art may be exerted.

However, on the other hand, the following problem may occur. When the brightness level of the video signal or the lamp power shifts from the higher state (the higher state of the lamp power) to the lower state (the lower state of the lamp power), the mercury within the arc tube comes to be condensed. Concurrently, the rotational speed of the cooling fan shifts from the faster state to the slower state. It is desirable to keep the evaporated state of the mercury as far as possible, and thus, it is desirable to prevent cooling of the light source lamp by reducing the rotational speed of the cooling fan as fast as possible. However, in the method in related art, the speed at which the rotational speed of the cooling fan decreases is lower because of the above described delay effect, and cooling of the light source lamp is faster and the condensation of the mercury is accelerated.

SUMMARY

An advantage of some aspects of the invention is to provide a projector and a control method thereof that may secure reliability by holding a temperature of a light source as high as possible when a brightness level of a video signal and a power level of the light source vary.

An aspect of the invention is directed to a projector of performing light control by varying a power level of a light source in response to a video signal. The projector includes a display device that changes and displays light output from the light source, a lamp as the light source, a cooling fan that cools the light source, and a control device that averages samples of the power level of the lamp based on the video signal or a brightness level of the video signal acquired with respect to each unit time and performs feedback control of a rotational speed of the cooling fan based on the average value, wherein the control device varies the number of samples and calculates the average value between the cases where the power level or the brightness level is rising and falling.

In the aspect of the invention, the samples of the power level of the light source lamp based on the video signal or the brightness level of the video signal acquired with respect to each unit time are averaged and feedback control is performed on the rotational speed of the cooling fan based on the average value. In this regard, the number of samples is varied and averaged between the cases where the power level or the brightness level is rising and falling, and the rotational speed of the cooling fan is controlled based on the calculated average value. Thereby, during driving of the projector, the lamp temperature may be held as high as possible. Therefore, the aspect of the invention is preferable when an ultrahigh-pressure mercury lamp is used as the lamp for the projector. In this case, because lamp temperature may be held as high as possible, the evaporated state of mercury is kept, and reliability may be secured, illuminance may be stabilized, and hue may be maintained.

Further, the control device may have a function of setting the number of samples relatively larger in the case where the power level or the brightness level is rising than that in the case where the power level or the brightness level is falling.

Thereby, when the power level or the brightness level is rising, the rotational speed may follow the variations of the power level or the brightness level with a delay, and the temperature of the light source (lamp) may quickly be raised and the mercury within the lamp may be quickly evaporated. Further, when the power level or the brightness level is falling, the rotational speed may follow the variations of the power level or the brightness level with little delay. That is, the rotational speed of the cooling fan may be promptly lowered with the reduction of the power level, and thus, the temperature of the lamp may be held as high as possible.

As described above, the lamp temperature is held at a high temperature, rising of the illuminance may be improved, reliability of the lamp may be improved, and deterioration in hue of the video may be prevented as a projector product. Thereby, a high-quality projector may be obtained.

Furthermore, the control device may have a function of calculating a derivative value of the power level or the brightness level, and determining that the power level or the brightness level is rising if the derivative value is positive and determining that the power level or the brightness level is falling if the derivative value is negative.

As described above, by calculating the derivative value of the power level or the brightness level, the amounts of change of the power level or the brightness level, i.e., light and dark (shading) of the video may be extracted.

In addition, the control device may have a function of determining that the power level or the brightness level is unchanged if the derivative value is zero.

Thereby, when the derivative value of the power level or the brightness level is zero, the control device determines that the power level or the brightness level is unchanged (not varied), and thus, the derivative value of the power level or the brightness level at the previous time may be continuously used.

Another aspect of the invention is directed to a control method of a projector of performing light control by varying a power level of a light source in response to a video signal. The method includes detecting the power level based on the video signal or a brightness level of the video signal, calculating derivative values of the power level or the brightness level, varying the number of samples to be averaged and calculating integral values in a first period in which the derivative value is positive and a second period in which the derivative value is negative, and determining a rotational speed of a cooling fan based on the integral values calculated in the respective periods.

According to the control method of the projector of the aspect of the invention, the variation mode (rising or falling) of the power level or the brightness level is detected by calculating the derivative values of the power level of the light source or the brightness level of the video signal. The number of samples to be averaged is varied and integral values are calculated in the first period in which the derivative value is positive (the rising period of the power level and the brightness level) and the second period in which the derivative value is negative (the falling period of the power level and the brightness level), and the rotational speed of the cooling fan is determined based on the integral values calculated in the respective periods. Thereby, during driving of the projector, the lamp temperature may be held as high as possible. Therefore, the aspect of the invention is preferable when an ultra-high-pressure mercury lamp is used as the lamp for the projector.

Further, the number of samples acquired in the first period may be larger than the number of samples acquired in the second period.

According to the method, when the power level or the brightness level is rising, the rotational speed may follow the variations of the power level or the brightness level with a delay, and the lamp temperature may quickly be raised and the mercury within the lamp may be quickly evaporated. Further, when the power level or the brightness level is falling, the rotational speed may follow the variations of the power level or the brightness level with little delay. That is, the rotational speed of the cooling fan may be promptly lowered with the reduction of the power level, and thus, the temperature of the lamp may be held as high as possible. As a result, rising of the illuminance may be improved, reliability of the lamp may be improved, and deterioration in hue of the video may be prevented as a projector product. Thereby, a high-quality projector may be obtained.

BRIEF DESCRIPTION OF THE DRAWINGS

The invention will be described with reference to the accompanying drawings, wherein like numbers reference like elements.

DESCRIPTION OF EXEMPLARY
EMBODIMENTS

As below, embodiments of the invention will be explained with reference to the drawings. In the respective drawings used for the following explanation, the scales of the respective members are appropriately changed for recognizable sizes of the respective members.

Note that, in the respective drawings, the vertical direction is defined as the y-axis direction, the output direction of the light output from a light source device is defined as the z-axis direction, and the direction perpendicular to the y-axis direction and the z-axis direction is defined as the x-axis direction.

Figure 1:
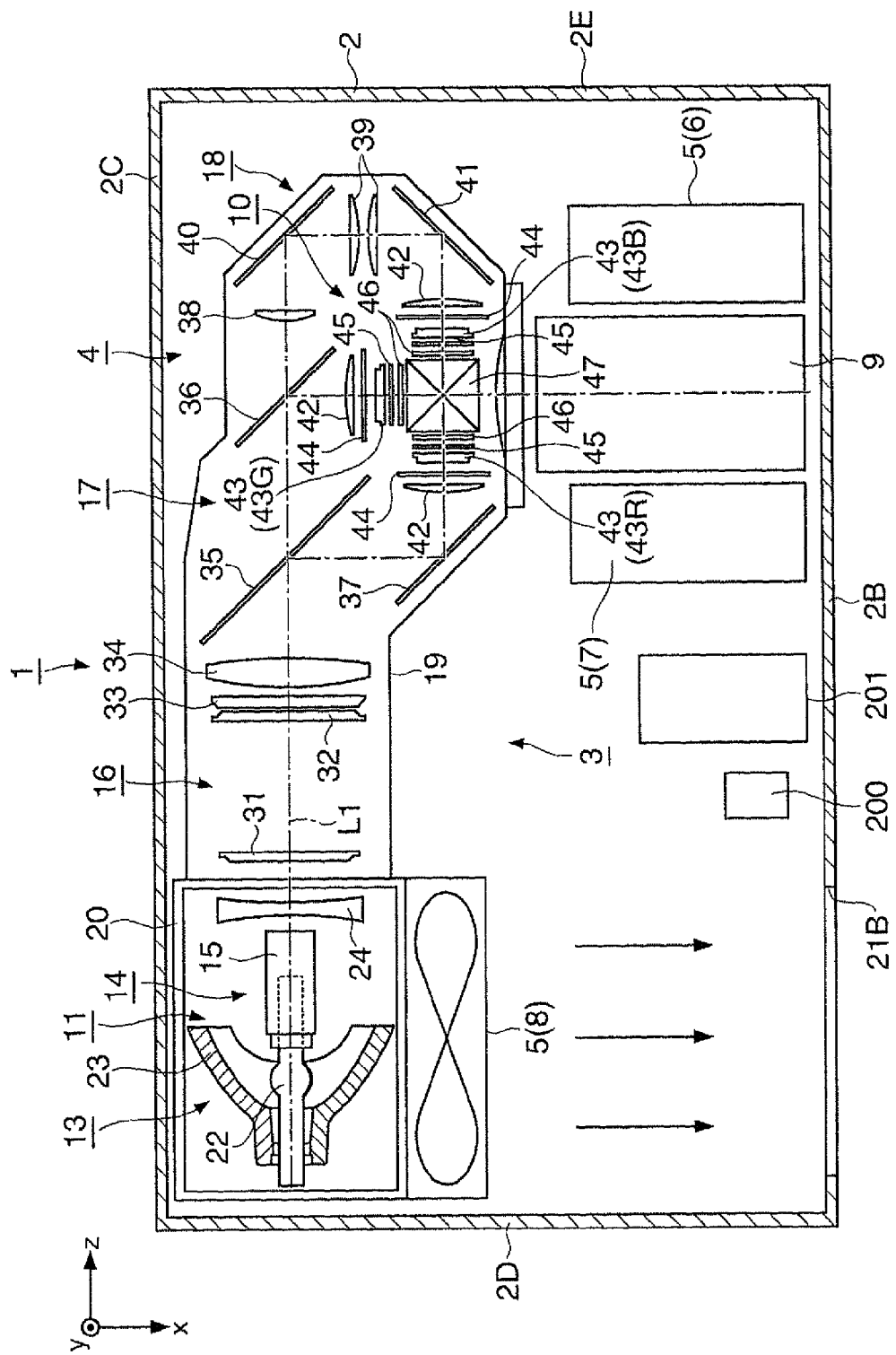
FIG. 1 is a plan view showing an overall configuration of a projector as one embodiment of the invention.

FIG. 1 is a plan view showing an overall configuration of a projector as one embodiment of the invention.

A projector 1 of the invention is an example of the so-called 3LCD liquid crystal projector using three sets of transmissive liquid crystal light valves as light modulators.

As shown in FIG. 1, the projector 1 of the embodiment includes an exterior casing 2 having a nearly rectangular shape in the plan view, and an apparatus main body 3 held in the exterior casing 2.

The exterior casing 2 forms a top surface (not shown: the front side in FIG. 1), a front surface 2B, a rear surface 2C, a left side surface 2D, a right side surface 2E, and a bottom surface (not shown: the back side in FIG. 1) of the projector 1, and plural leg parts (not shown) are provided on the bottom surface.

The apparatus main body 3 includes an optical unit 4 and a main body cooling device 5. The apparatus main body 3 includes a power supply device 200 that supplies power to the respective component members of the projector 1, a control device 201 that controls the operation of the respective component members of the projector 1, etc.

The main body cooling device 5 includes plural fans 6, 7, 8, and blows air introduced from outside of the exterior casing 2 to the power supply device 200 and the control device 201, and cools the respective devices.

Of the plural fans 6, 7, 8, a pair of fans 6, 7 provided on both sides with a projection optical device 9, which will be described later, in between include sirocco fans, for example, and introduces the outside air from an intake port (not shown) formed in the exterior casing 2 and blows cooling air to an image forming optical device 10, which will be described later. Further, the fan (also referred to "cooling fan") 8 includes an axial flow fan, for example, and suctions the air that has cooled an optical device 11, which will be described later and ejects the air toward the front surface 2B of the projector 1, and further ejects the air to the outside of the exterior casing 2 through an exhaust port 21B formed in the front surface 2B.

Note that the exhaust port 21B may be formed in any surface of the exterior casing 2.

The optical unit 4 forms image light in response to image information by control using the above described control device 201. The optical unit 4 includes the light source device 11, an illumination optical device 16, a color separation optical device 17, a relay optical device 18, the image forming optical device 10, the projection optical device 9, an optical component casing 19, a light source housing member 20, etc.

Configuration of Light Source Device

As shown in FIG. 1, the light source device 11 is configured to include a light source lamp (light source) 13 having an arc tube 22 and a reflector 23, a cooling device 14 that cools the arc tube 22, and a parallelizing concave lens 24 that parallelizes light from the light source lamp 13, and is housed within the light source housing member 20.

The light source lamp 13 is an arc-discharge lamp, and an ultrahigh-pressure mercury lamp, a metal halide lamp, a xenon lamp, or the like is used. The arc-discharge lamp is used in combination with the cooling device 14 because the arc tube is heated by arc heat. In the embodiment, a fan 15 forming the cooling device 14 is provided near the light source lamp 13. The fan 15 includes a sirocco fan, for example, and suctions the air within the exterior casing 2 and blows the air to the light source lamp 13.

The illumination optical device 16 includes a pair of lens arrays 31, 32, a polarization conversion element 33, and a superimposing lens 34.

The color separation optical device 17 includes a first dichroic mirror 35, a second dichroic mirror 36, and a reflection mirror 37.

The relay optical device 18 includes a light incident-side lens 38, a group of relay lenses 39, a first reflection mirror 40, and a second reflection mirror 41.

The image forming optical device 10 includes a field lens 42, liquid crystal light valves (light modulation devices) 43 for respective color lights of red light, green light, blue light as a light modulator, light incident-side polarizers 44, viewing angle compensators 45, and light exiting-side polarizers 46 corresponding to the respective liquid crystal light valves 43, and a cross dichroic prism 47 as a color combining device.

Note that, as the liquid crystal light valves, a liquid crystal light valve 43R for red light modulation, a liquid crystal light valve 43G for green light modulation, a liquid crystal light valve 43B for blue light modulation are provided.

The projection optical device 9 enlarges and projects the image light formed by the image forming optical device 10 on a projected surface of a screen or the like.

The optical component casing 19 is a box-shaped casing that holds the above described illumination optical device 16, color separation optical device 17, relay optical device 18, and image forming optical device 10 inside. In the optical component casing 19, the illumination optical device 16, the color separation optical device 17, the relay optical device 18, and the image forming optical device 10 are sequentially arranged in predetermined positions on a lamp optical axis L1 set inside. The light source housing member 20 is connected to one surface of the optical component casing 19 and the light source device 11 is housed inside.

The light output from the light source device 11 is homogenized in illuminance within the illumination region by the illumination optical device 16, and then, separated into three color lights of red light, green light, and blue light by the color separation optical device 17. The separated respective color lights are respectively modulated in response to image information in the corresponding respective liquid crystal light valves 43, and image lights with respect to each color light are formed. Then, the image lights with respect to each color light are combined by the cross dichroic prism 47, and enlarged and projected on the projected surface by the projection optical device 9.

Typically, the cooling fan 8 is provided in the projector 1 for preventing temperature deterioration of the light source lamp 13. However, in the ultrahigh-pressure mercury lamp used as the light source lamp 13, if the lamp temperature becomes too low, mercury is condensed and reliability may be reduced, and control of the lamp temperature is important. When lamp light control is performed by varying the power level of the light source lamp 13 in response to a video signal V1, it is necessary to hold the lamp temperature as high as possible in either of a rising change and a falling change of the power level.

The projector 1 of the embodiment can prevent overcooling of the light source lamp 13 by controlling the rotational speed of the cooling fan 8 using the variation modes of the brightness level and the power level. Here, the power level of the light source lamp 13 that varies based on the video signal V1 has a direct relationship to the lamp temperature, and accordingly, in the embodiment, an example of performing temperature adjustment of the light source lamp 13 by controlling the rotational speed of the cooling fan 8 using the power level of the light source lamp 13 will be described.

Figure 2:
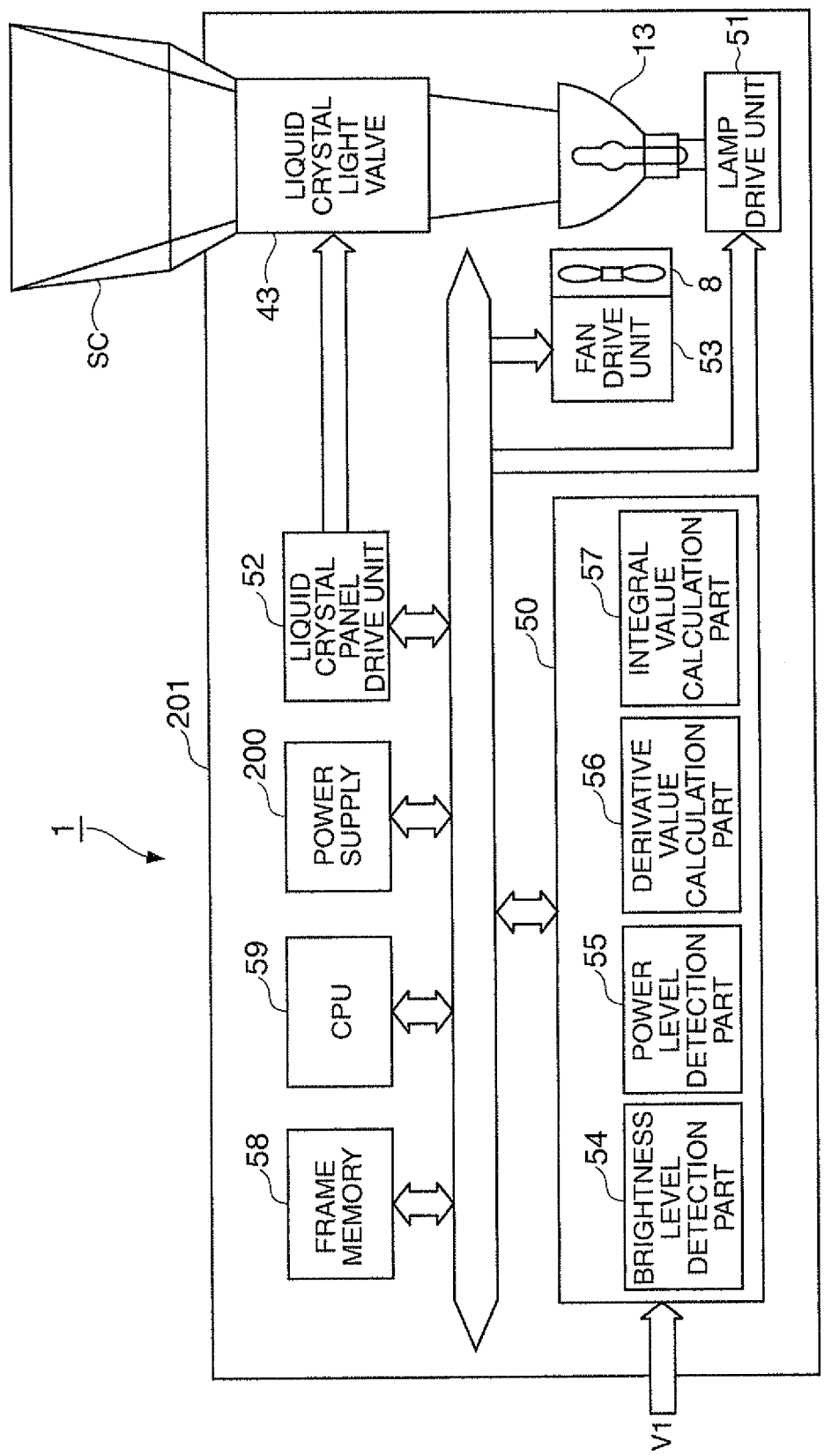
FIG. 2 is an example of a block diagram showing a schematic configuration of a control device of the embodiment.

FIG. 2 is an example of a block diagram showing a schematic configuration of the control device of the embodiment.

As shown in FIG. 2, the control device 201 includes a CPU 59, a signal processing unit 50, a lamp drive unit 51, a liquid crystal panel drive unit 52, a fan drive unit 53, a frame memory 58, etc., and drives the light source lamp 13, the liquid crystal light valves 43, and the cooling fan 8 based on the video signal V1 input from outside.

The signal processing unit 50 of the embodiment has a brightness level detection part 54, a power level detection part 55, a derivative value calculation part 56, and an integral value calculation part 57, performs predetermined signal processing on the video signal V1 input from outside, and outputs various information obtained by the processing to the CPU 59. The signal processing here is signal processing for respectively optimally driving the light source lamp 13, the liquid crystal light valves 43, and the cooling fan 8, and the details will be described later. The CPU 59 performs drive control of the light source lamp 13, the liquid crystal light valves 43, and the cooling fan 8 based on the various information input from the signal processing unit 50.

The brightness level detection part 54 detects the brightness level of the input video signal V1, and the power level detection part 55 detects the power level to be supplied to the light source lamp 13 based on the input video signal V1. The brightness level and the power level change in response to the video signal V1, and have relationships to the brightness of the video (image).

Here, in the brightness level detection part 54 and the power level detection part 55, the brightness level of the input video signal V1 and the power level of the light source lamp 13 may be detected with respect to one screen, each frame, or one field, for example.

The derivative value calculation part 56 extracts times when amounts of change of the power level, i.e., amounts of change of light and dark (shading) of the video are larger by calculating time derivative values of the power level of the light source lamp 13 based on the input video signal V1. Depending on positive or negative of the derivative value calculated in the derivative value calculation part 56, the power level is determined as being rising, falling, or constant in response to the video signal V1 in the CPU 59. That is, if the derivative value of the change is positive, the power level is determined as being rising, if the derivative value of the change is negative, the power level is determined as being falling, and if the derivative value is zero, the power level is determined as being constant (unchanged). If the derivative value is zero, the derivative value at the previous time is continuously used.

Further, the derivative value calculation part 56 also can calculate time derivative values of the brightness level of the input video signal V1. In this case, the CPU 59 determines rising or falling of the brightness level of the video signal V1 depending on positive or negative of the derivative value of the power level calculated in the derivative value calculation part 56.

The integral value calculation part 57 averages the temporal changes of the power level by calculating the time integral values of the power level of the light source lamp 13 based on the input video signal V1. In this regard, the number of samples of the power level to be averaged acquired in unit time is changed in response to the above described calculation result of the derivative value calculation part 56. That is, the number of samples of the power level to be averaged in the period is varied according to rising or falling of the power level determined depending on positive or negative of the derivative value calculated in the derivative value calculation part 56. For example, the number of samples in the period in which the power level rises is set relatively larger than the number of samples in the period in which the power level falls. As a result, the number of samples increases and the time for averaging becomes longer, and thus, a distribution of the average power level in which variations with time are smaller is obtained. Further, the number of samples in the period in which the power level falls is set relatively smaller than the number of samples in the period in which the power level rises. As a result, the number of samples decreases and the time for averaging becomes shorter, and thus, a distribution of the average power level that changes nearly along the power level is obtained. That is, as the number of power level samples to be averaged in a predetermined period is smaller, a distribution that follows the temporal change of the power level based on the input video signal is obtained.

Here, when the power level tends to rise, the number of samples is set to 1000, and, when the power level tends to fall, the number of samples is set to 100. The number of samples is not limited to those, but may be appropriately changed.

Note that the integral value calculation part 57 may average the time change of the brightness level by calculating the time integral values of the brightness level of the input video signal V1. In this case, the number of brightness level samples to be averaged is changed in response to the calculation result of the derivative values of the above described brightness level derivative value calculation part 56.

In the frame memory 58, tables (LUTs) or mathematical expressions showing correlations between the power level of the light source lamp 13 and the rotational speed of the cooling fan 8 are stored in advance. The CPU 59 reads out control data of the rotational speed of the cooling fan 8 in response to the video signal V1 from the tables and mathematical expressions stored in the frame memory 58, checks the data against the processing signals input from the integral value calculation part 57, and generates a control signal of the cooling fan 8. Then, the CPU outputs the generated control signal to the fan drive unit 53.

The CPU 59 performs control so that the illuminance of the light source lamp 13 may become higher and the rotational speed of the cooling fan 8 may be gradually higher as the power level (brightness level) of the video signal V1 is larger.

Further, the CPU performs control so that the illuminance of the light source lamp 13 may become lower and the rotational speed of the cooling fan 8 may promptly be lower as the power level (brightness level) of the video signal V1 is smaller.

The rotational speed of the cooling fan 8 affects the cooling efficiency of the light source lamp 13. That is, by detecting the variation mode of the power level of the light source lamp 13 based on the video signal V1 and controlling the rotational speed of the cooling fan 8, the cooling speed of the light source lamp 13 may be adjusted.

Further, the CPU 59 generates the drive signal of the light source lamp 13 based on the detection result from the power level detection part 55 and outputs it to the lamp drive unit 51. In this manner, illuminance adjustment of the light source lamp 13 based on the video signal V1 is performed.

The CPU 59 performs control so that the illuminance of the light source lamp 13 may become higher and the rotational speed of the cooling fan 8 may be gradually higher as the power level (brightness level) of the video signal V1 rises. Further, the CPU performs control so that the illuminance of the light source lamp 13 may become lower and the rotational speed of the cooling fan 8 may promptly be lower as the power level (brightness level) of the video signal V1 falls.

Further, the CPU 59 converts and processes the video signal V1 into a signal necessary for driving the respective liquid crystal light valves 43 based on the detection result from the brightness level detection part 54 input from the signal processing unit 50, and outputs it to the liquid crystal panel drive unit 52.

Figure 3:
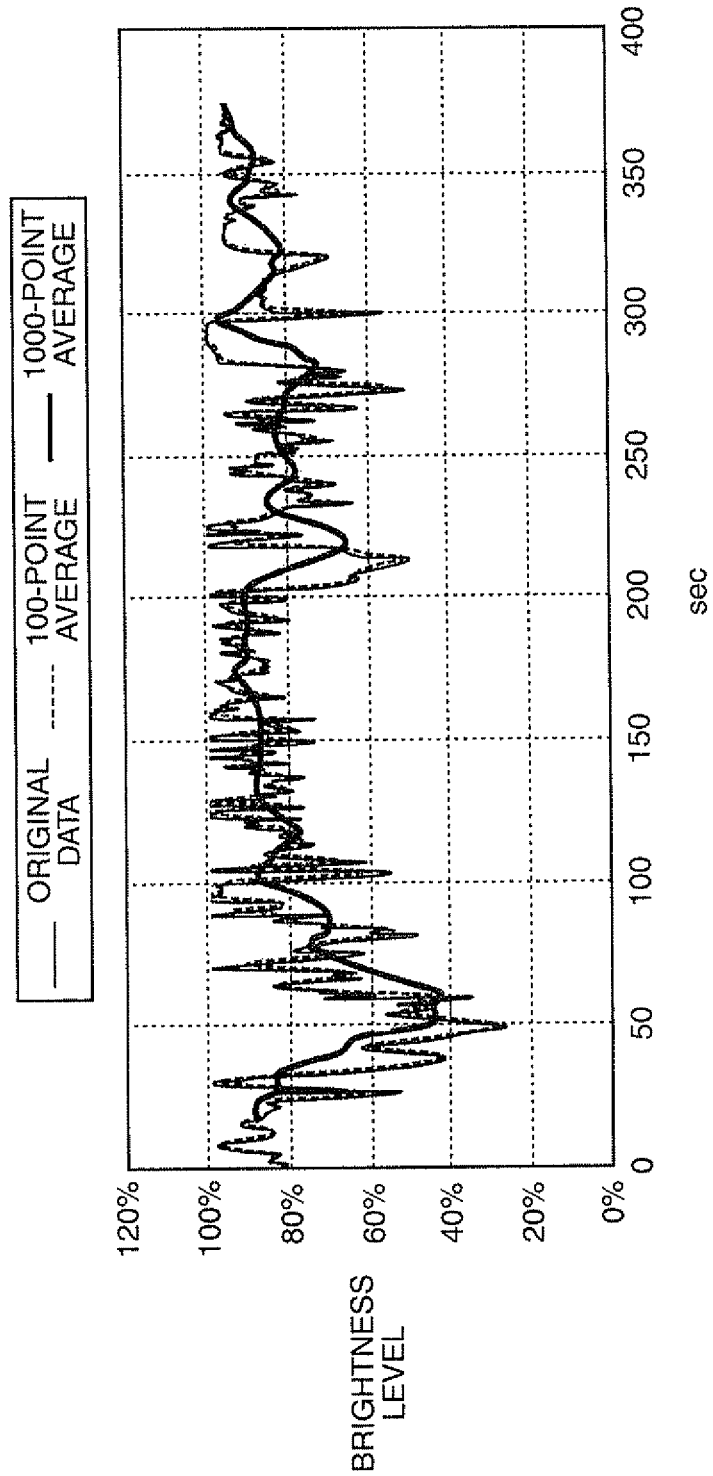
FIG. 3 is a graph representing brightness levels of certain video signals and integral values thereof.
Figure 4:
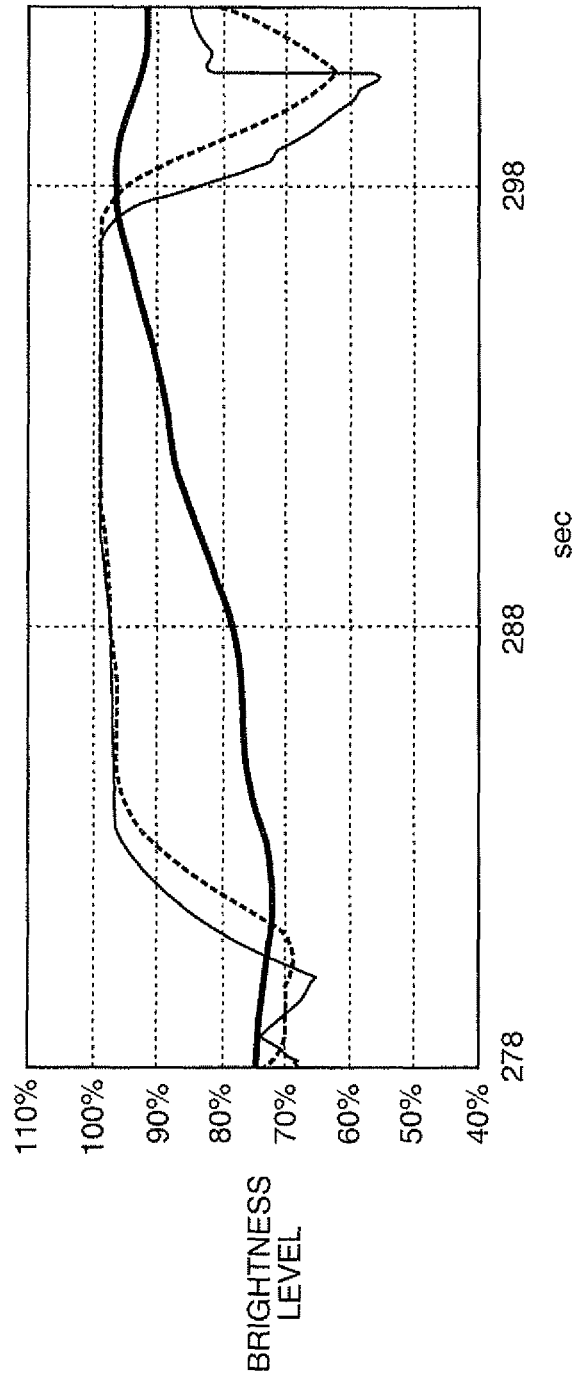
FIG. 4 is a graph showing a part of the graph (from 278 to 300 sec) shown in FIG. 3 in a larger scale.

FIG. 3 is a graph of brightness levels of certain video signals extracted for about six minutes (sampling interval: 1/60 sec), and shows original brightness level data by a thin solid line, an average value when the number of samples is set to 100 by a broken line, and an average value when the number of samples is set to 1000 by a thick solid line. FIG. 4 is a graph showing a part of the graph (from 278 to 300 sec) shown in FIG. 3 in a larger scale.

In FIGS. 3 and 4, it is known that followability with respect to the brightness level (the original data shown by the thin line) is higher in the 100-point average (time average of 100 samples) shown by the broken line and the followability with respect to the brightness level is slower in the 1000-point average (time average of 1000 samples) shown by the thick line. That is, the larger the number of samples, the more the original data is averaged, and thus, the average is shown by a gentler curve.

As described above, the rotational speed of the cooling fan 8 as a component element of the main body cooling device 5 of the embodiment is controlled based on the change of the brightness level of the video signal or the power level of the light source lamp 13.

Note that, in FIGS. 3 and 4, the variation modes of the brightness level of the video signal and its integral values are shown, however, nearly the same graph is obtained with respect to the power level of the light source lamp that varies based on the video signal and its integral value. In the case where adaptive light control is performed, the lamp power should react with the video signal with no delay, and substantially follows the brightness level.

Figure 5:
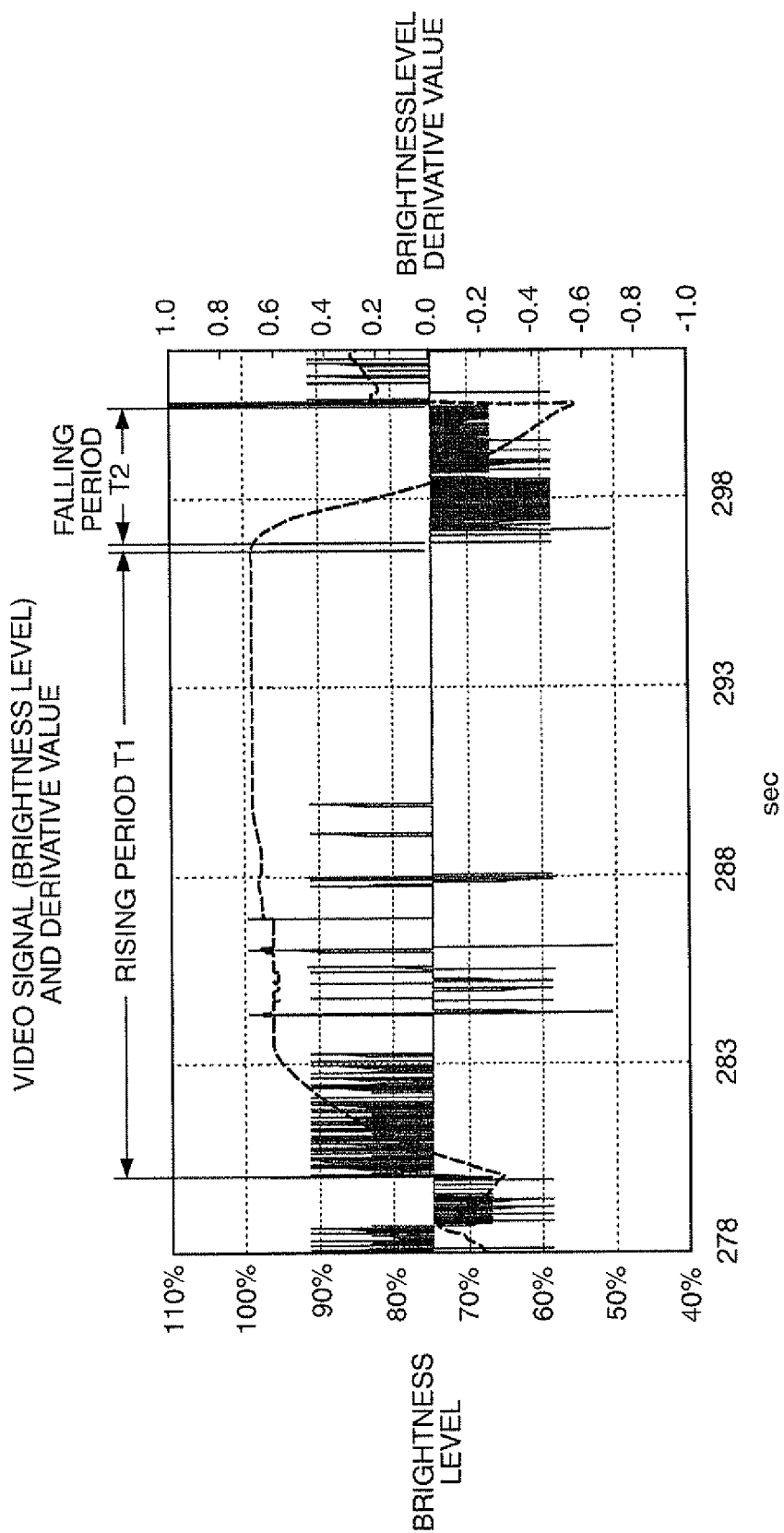
FIG. 5 is a graph showing distribution waveforms of a brightness level of a video signal (a power level of a lamp) and a derivative quantity of the brightness level (the power levels of the lamp).

FIG. 5 shows distribution waveforms of the brightness level of the video signal (the power level of the lamp) and a derivative quantity of the brightness level (the power level of the lamp).

According to the relationship between the brightness level of the video signal and its derivative value, it is known that the brightness level rises in the rising period (first period) T1 in which the derivative value is positive and the brightness level falls in the falling period (second period) T2 in which the derivative value is negative. In the drawing, there are a few parts in which the derivative value is a negative value even when the brightness level rises, however, they are not taken in consideration in the embodiment because they are regarded as some influence by noise.

Note that, in FIG. 5, the variation mode of the brightness level is shown, and the power level and its derivative value exhibit nearly the same variation mode.

Control Method of Projector

Next, a control method of the projector will be described.

Figure 6:
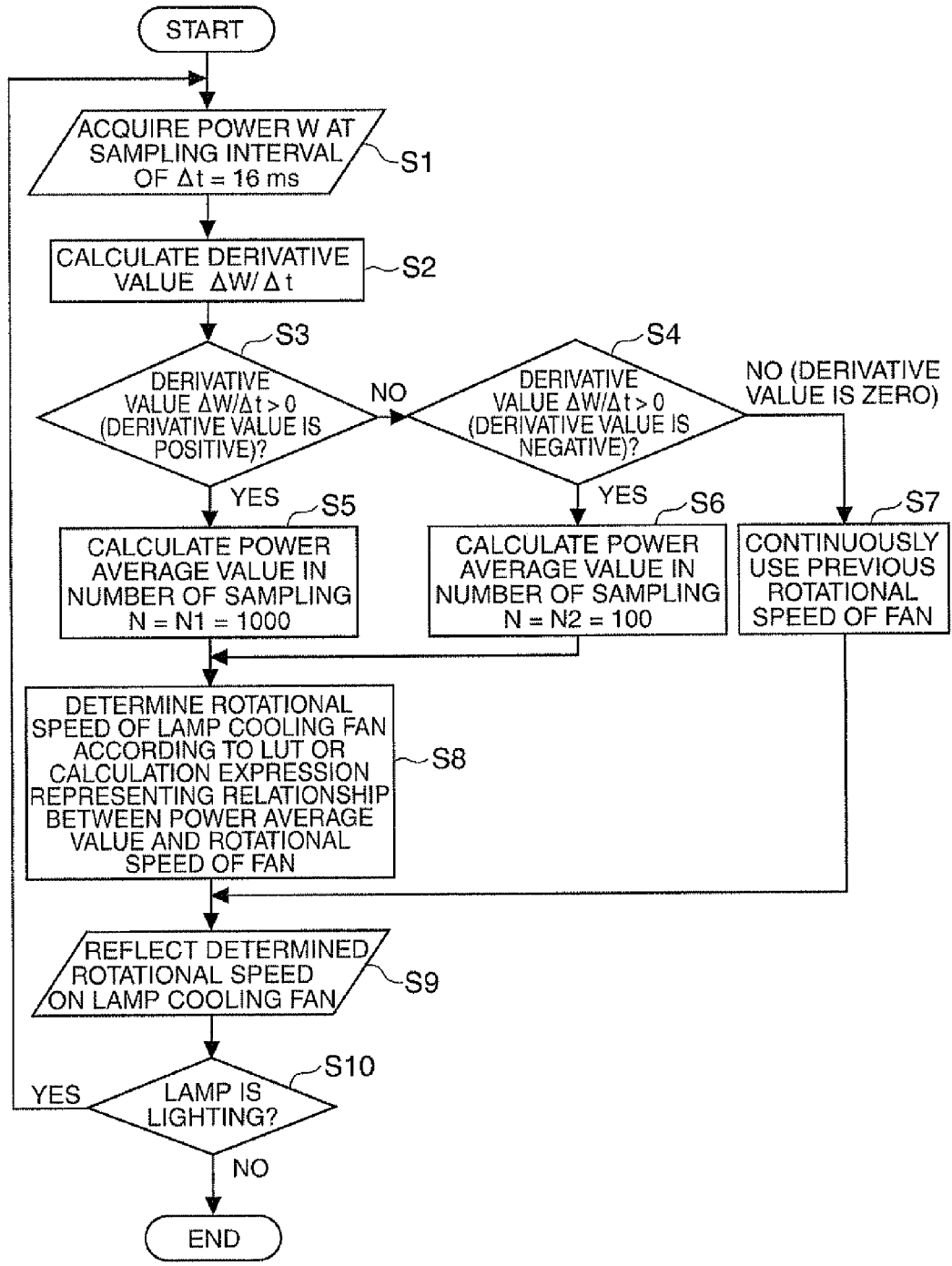
FIG. 6 is a flowchart showing procedures of processing executed by a control system of the projector.

FIG. 6 is a flowchart showing procedures of processing executed by a control system of the projector.

Figure 7:
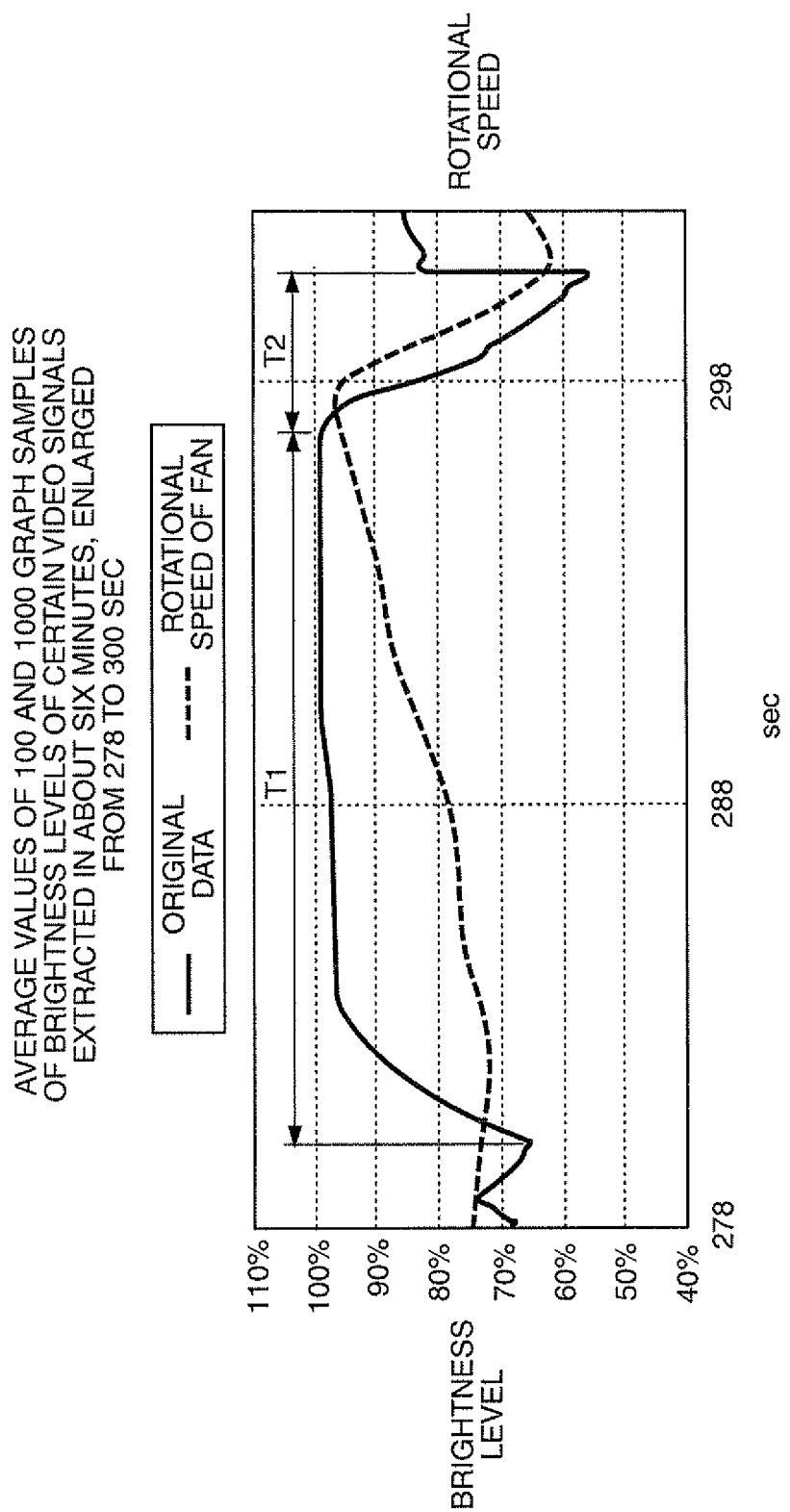
FIG. 7 is a graph showing variation modes of the power level and a rotational speed of a cooling fan.

FIG. 7 is a graph showing variations of the power level and the rotational speed of the cooling fan.

First, when the video signal V1 is input from outside to the signal processing unit 50 of the control device 201, the brightness level of the video signal V1 is detected in the brightness level detection part 54 and the power level W to be supplied to the light source lamp 13 is detected based on the video signal V1 in the power level detection part 55 (step S1).

The CPU 59 calculates a derivative value (amount of change) $\Delta W/\Delta t$ of the power level W from the detection result of the power level detection part 55 in the derivative value calculation part 56 (step S2), and the variation mode (rising, falling, constant) of the power level W of the video signal V1 is determined by the derivative value $\Delta W/\Delta t$.

Then, if the derivative value $\Delta W/\Delta t$ calculated in the derivative value calculation part 56 is determined as positive (step S3), the power level W is regarded as being rising and the process moves to step S5. Further, if the derivative value $\Delta W/\Delta t$ is determined as negative (step S4), the power level W is regarded as being falling and the process moves to step S6. Furthermore, if the derivative value is determined as not positive or negative, but "zero" at step S4, the power level W is regarded as being unchanged and the process moves to step S7. Here, the period in which the power level W is determined as positive is the rising period T1 in which the power level W is rising, and the period in which the power level W is determined as negative is the falling period T2 in which the power level W is falling.

Then, in the integral value calculation part 57, the time integral value of the power level W is calculated from the detection result from the power level detection part 55, and thereby, the temporal change of the power level W is averaged. In this regard, the CPU 59 controls the integral value calculation part 57 to vary the number of samples N of the power level W acquired with respect to each unit time in the rising period T1 and the falling period T2 based on the derivative value $\Delta W/\Delta t$ of the power level W determined according to the calculation result of the derivative value calculation part 56.

Specifically, in the rising period T1 in which the power level W of the light source lamp 13 is rising, the number of samples N1 is set to 1000 and they are averaged (step S5), and, in the falling period T2 in which the power level W of the light source lamp 13 is falling, the number of samples N2 is set to 100 and they are averaged (step S6). Then, the calculation results (averaged data of the power level W) obtained at the respective steps S5, S6 are output to the CPU 59.

Note that, in the case where the calculation result of the derivative value $\Delta W/\Delta t$ is zero in the derivative value calculation part 56 and the power level W is determined as being unchanged, the previous rotational speed of the cooling fan 8 is determined to be continuously used at step S7, and the process moves to step S8.

When averaged data of the power level W in the respective periods T1, T2 are respectively input from the integral value calculation part 57, the CPU 59 reads out the control data of the rotational speed of the cooling fan 8 in response to the video signal from the tables (LUTs) and calculation expressions stored in the frame memory 58, checks the data against the processing signals input from the integral value calculation part 57, and thereby, determines the rotational speed of the cooling fan 8 and generates a control signal thereof (step S8).

Then, in the rising period T1, a control signal by which the change rate of the rotational speed of the cooling fan 8 is smaller than that of the falling period T2 is generated, and, in the falling period T2, a control signal by which the change rate of the rotational speed is larger than that of the rising period T1 is generated.

Further, if the power level W of the light source lamp 13 does not rise or fall, that is, the integral value is zero, the rotational speed of the cooling fan 8 in the period is not changed and a control signal to maintain the state is generated. Then, the control signals are output to the fan drive unit 53.

Then, the fan drive unit 53 drives the cooling fan 8 based on the control signal of the input rotational speed of the fan (step S5). That is, as shown in FIG. 7, in the rising period T1, the control is performed to slowly make the rotational speed of the cooling fan 8 higher based on the integral value (the graph of 1000-point average) of the power level (brightness level) within the period T1. In this manner, the temperature of the light source lamp 13 is immediately raised.

Further, in the falling period T2, the control is performed to quickly make the rotational speed of the cooling fan 8 lower based on the integral value (the graph of 100-point average) of the power level (brightness level) within the period T2. In this manner, the temperature reduction of the light source lamp 13 is prevented and the temperature is held as high as possible. Here, the temperature of the light source lamp 13 is held at a temperature at which the deterioration thereof is prevented.

As described above, the projector 1 of the embodiment controls the rotational speed of the cooling fan 8 in response to the variation mode of the power level of the light source lamp 13 based on the video signal, and thereby, the reduction of the temperature of the light source lamp 13 is prevented and the evaporated state of the mercury is maintained as far as possible. Specifically, by varying the number of samples of the power level to be averaged within the respective periods in the integral value calculation part 57 between the cases where the power level of the light source lamp 13 tends to rise and tends to fall, the followability of the rotational speed of the cooling fan 8 with respect to the variation of the power level is changed.

When the power level is shifted from the lower state to the higher state, the mercury within the light source lamp 13 gradually is evaporated from the condensed state. Then, the rotational speed of the cooling fan 8 also shifts from the slower state to the faster state in response to the average value of the power level. In this regard, it is preferable that the speed at which the rotational speed of the cooling fan 8 increases is slower for evaporation of the mercury as fast as possible.

Accordingly, in the embodiment, by setting the number of power level samples to be averaged in the period in which the power level of the light source lamp 13 is rising larger (the time longer), the rotational speed of the cooling fan 8 does not promptly follow the variation of the power level and slowly rises. The rotational speed of the cooling fan 8 smoothly varies (rises) and follows the variation of the power level with a delay, and thus, the lamp temperature may quickly be raised and the mercury within the arc tube of the light source lamp 13 may quickly be evaporated. Further, while the temperature for promoting the evaporation of the mercury within the light source lamp 13 is kept, necessary cooling for preventing the deterioration of the arc tube or the like may be performed.

In addition, when the power level shifts from the higher state to the lower state, the mercury of the light source lamp 13 comes to be condensed. In this regard, the rotational speed of the cooling fan 8 shifts from the faster state to the slower state. To keep the mercury within the light source lamp 13 in the evaporated state as far as possible, it is necessary to reduce the rotational speed of the cooling fan 8 as fast as possible.

Accordingly, in the embodiment, by setting the number of samples of the power level to be averaged in the period in which the power level of the light source lamp 13 falls smaller (the time shorter), the rotational speed of the cooling fan 8 substantially follows the variations of the power level. That is, the rotational speed of the cooling fan 8 may be immediately reduced with the reduction of the power level, and thus, the temperature of the light source lamp 13 may be held as high as possible. Thereby, condensation of the mercury within the light source lamp 13 may be delayed.

In this manner, by time-averaging the power level of the externally input video signal and performing feedback-control of the rotational speed of the cooling fan 8 based on the average value, the lamp temperature of the light source lamp 13 may be held as high as possible. Thereby, the evaporated state of the mercury may be kept. As a result, there are expectable advantages that reliability of the light source lamp 13 may be made higher and rising of the illuminance may be improved, and deterioration of hue of the video may be prevented as a projector product.

Further, when the rotational speed of the cooling fan 8 is controlled, the integral value (average value) of the power level of the light source lamp 13 is used so that the rotational speed of the cooling fan 8 may not be sensitive to the power level (brightness level). Thereby, flicker of the image is prevented and eye strain of a viewer may be reduced, and the viewer may visually recognize the image projected on the screen in good condition in a long period.

Furthermore, the control is performed so that the rotational speed of the cooling fan 8 may follow the averaged data of the power level, and thereby, it is not necessary to make the rotational speed of the fan sensitive (frequently vary the rotational speed of the cooling fan 8) to the variation of the power level (brightness level) and the noise problem may be improved.

The preferred embodiment according to the invention has been explained with reference to the accompanying drawings, however, obviously, the invention is not limited to the example. It is clear that a person who skilled in the art could arrive various modified examples or altered examples within the scope of the technical idea described in appended claims, and it would be understood that the examples naturally fall within the technical idea of the invention.

In the embodiment, the control of the rotational speed of the cooling fan 8 has been performed in response to the variations of the power level of the light source lamp based on the video signal, however, control of the rotational speed of the cooling fan 8 may be performed in response to the variations of the brightness level of the video signal. In this case, in the period in which the brightness level is rising, by setting the number of samples to be averaged smaller (the time shorter) than that in the period in which the brightness level falls, the rotational speed of the cooling fan 8 may follow the variations of the brightness level with a delay, and further, in the period in which the brightness level falls, the rotational speed may substantially follow the variations of the brightness level. Thereby, like the embodiment, the temperature of the light source lamp 13 may be held as high as possible.

The entire disclosure of Japanese Patent Application No. 2011-148902, filed Jul. 5, 2011 is expressly incorporated by reference herein.

What is claimed is:

1. A projector that performs light control by varying power level of a light source in response to a video signal, the projector comprising:
   a lamp including the light source;
   a light modulation device configured to modulate illumination light from the light source in response to image information;
   a cooling fan configured to cool the light source; and
   a control device configured to average samples of the power level of the lamp based on the video signal or a brightness level of the video signal acquired with respect to each unit time, and performs feedback control of a rotational speed of the cooling fan based on the average value, wherein:
   the control device is configured to: (1) calculate a first average value from a first number of samples in response to an increase in the power level or the brightness level, and (2) calculate a second average value different from the first average value from a second number of samples different from the first number of samples in response to a decrease in the power level or the brightness level, and
   the control device being configured to set the number of samples to be greater in response to an increase in the power level or the brightness level, and to set the number of samples to be smaller in response to a decrease in the power level or the brightness level.

2. The projector according to claim 1, wherein the control device has a function of calculating a derivative value of the power level or the brightness level, and determining that the power level or the brightness level is rising if the derivative value is positive and determining that the power level or the brightness level is falling if the derivative value is negative.

3. The projector according to claim 2, wherein the control device has a function of determining that the power level or the brightness level is unchanged if the derivative value is zero.

4. A control method of a projector that performs light control by varying power level of a light source in response to a video signal, the method comprising:
   detecting the power level based on the video level or a brightness level of the video signal;
   calculating derivative values of the power level or the brightness level;
   calculating a first average value in a first period in which the derivative value is positive from a first number of samples;
   calculating a second average value different from the first average value during a second period in which the derivative value is negative from a second number of samples different from the first number of samples; and
   determining a rotational speed of a cooling fan based on the values calculated in the respective periods, wherein
   the number of samples are increased in response to an increase in the power level or the brightness level, and the number of samples are decreased in response to a decrease in the power level or the brightness level.

5. The method according to claim 4, wherein the number of samples acquired in the first period is larger than the number of samples acquired in the second period.

* * * * *